(12) United States Patent
Ausiello

(10) Patent No.: US 6,184,642 B1
(45) Date of Patent: Feb. 6, 2001

(54) SYSTEM AND A METHOD FOR CONTROLLING THE OPERATION OF A VEHICLE WIPER DEVICE

(75) Inventor: Francesco Paolo Ausiello, San Salvo (IT)

(73) Assignee: Denjo Manufacturing Italia S.P.A., Milan (IT)

( * ) Notice: Under 35 U.S.C. 154(b), the term of this patent shall be extended for 0 days.

(21) Appl. No.: 09/459,855

(22) Filed: Dec. 14, 1999

(30) Foreign Application Priority Data

Dec. 14, 1998 (IT) ................................................ T098A1043

(51) Int. Cl.$^7$ ........................................................ G05B 5/00
(52) U.S. Cl. ........................ 318/483; 318/443; 318/444; 150/250.17
(58) Field of Search ................................. 318/483, 443, 318/444; 15/250.17, 250.001

(56) References Cited

U.S. PATENT DOCUMENTS

| | | |
|---|---|---|
| 4,499,410 | 2/1985 | Iacoponi et al. . |
| 4,588,935 | 5/1986 | Kaneiwa et al. . |
| 4,922,570 * | 5/1990 | Hiroshima et al. ............... 15/250.02 |
| 5,119,002 | 6/1992 | Kato et al. . |
| 5,561,882 * | 10/1996 | Hirohama et al. .............. 15/250.001 |

FOREIGN PATENT DOCUMENTS 43 30 112   3/1995  (DE) .
WO 98/29285  7/1998  (WO) .

* cited by examiner

*Primary Examiner*—Karen Masih
(74) *Attorney, Agent, or Firm*—Sughrue, Mion, Zinn, Macpeak & Seas, PLLC

(57) ABSTRACT

A system and a method for controlling the operation of a vehicle window wiper device as a function of the quantity of liquid present on the window are described. The wiper device comprises an electric drive motor connected to at least one wiper blade arm provided with a wiper blade.

The control system comprises:
- a first sensor adapted to provide a first output signal corresponding to a first quantity dependent on the instantaneous friction between the wiper blade and the vehicle window;
- a second sensor adapted to provide a second output signal corresponding to a second quantity correlated to the aerodynamic load acting on the wiper blade; and
- a processing and control unit coupled to both sensors to receive at its input the first and the second signal).

The processing and control unit is arranged to determine a value of a third quantity correlated to the quantity of liquid present on the window on the basis of the received signals and by comparison with a predetermined reference model, and to provide output command signals for controlling the activation of the electric motor in a predetermined manner as a function of the determined value of this third quantity.

25 Claims, 1 Drawing Sheet

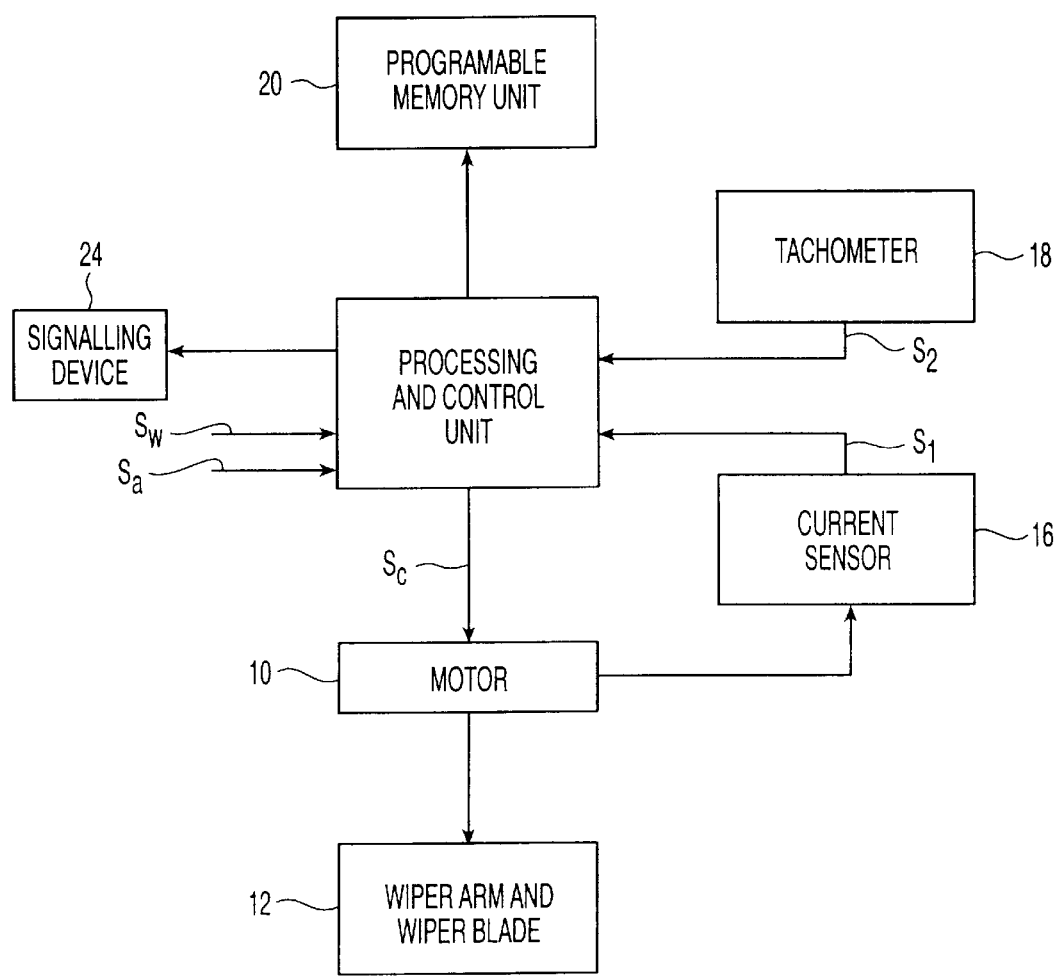

SYSTEM AND A METHOD FOR CONTROLLING THE OPERATION OF A VEHICLE WIPER DEVICE

The present invention relates to the technical field of vehicle wiper devices, and more particularly relates to a system and a method for controlling the operation of a vehicle window wiper device, the said device comprising:
- an electric drive motor connected to at least one wiper blade arm and adapted to impart to the arm an oscillating movement; and
- a wiper blade for the window coupled to the said at least one wiper blade arm, the control system (method) being adapted to control the operation of the wiper blade arm in a variable manner in dependence on the quantity of liquid present on the window.

It is known in the art automatically to control the operation of a wiper device (hereinafter more briefly wipers) in dependence on the presence of liquid and/or the quantity of liquid present on a window of a vehicle (for example the windscreen or rear window), the generic term "liquid" in this context indicating both rain or other types of hydrometeors and liquid detergent.

Rain sensors able to detect the presence of even a few drops on the window are, for example, formed by utilising optical components in combination with photo-detector devices or, in the most simple cases, are constituted by electrically conductive components the electrical resistance of which varies as a function of the rain present on the component.

Such sensors are disposed close to the window under control, and the information which they detect is provided to the input of the devices driving the wiper or wipers for activating/disactivating it/them or modifying it/their manner of operation.

A disadvantage of known arrangements is that of requiring the installation of specific components, which is onerous in itself, and therefore, in the last analysis, affects the sale price of the vehicle, making it possible to adopt such a device only for high prestige vehicles.

The arrangement of the sensor on the window must moreover be designed with care since the sensor must not reduce the transparency of the window, whilst simultaneously guaranteeing an accurate detection. The performance of the system is in fact related to the correct positioning of the sensor since there must be a correspondence between the real condition of the window and that detected by the sensor in the specific zone of the window placed under direct observation.

The object of the invention is that of overcoming the above-explained disadvantages by providing an innovative control system for the operation of a wiper device which does not need the installation of a specific rain sensor, but detects the presence and/or, indicatively, the quantity of rain indirectly through the operation of the wiper itself.

To this end the subject of the invention is a system for controlling the operation of a vehicle window wiper device characterised in that it comprises:
- first sensor means for detecting a first quantity dependent on the instantaneous friction between the said wiper blade and the vehicle window, adapted to provide a first output signal corresponding to this first quantity;
- second sensor means for detecting a second quantity correlated to the aerodynamic load acting on the said wiper blade, adapted to provide a second output signal corresponding to this second quantity; and
- a processing and control unit coupled to the said first and second sensor means for receiving the said first and second signal at its input, and arranged to:
  - determine a value of a third quantity correlated to the quantity of liquid present on the window on the basis of the received signals and by comparison with a predetermined reference model; and
  - provide output control signals for controlling the activation of the electric motor in a predetermined manner as a function of the determined value of the said third quantity.

The present invention also provides a method for controlling the operation of a vehicle wiper device characterised in that it comprises the operations of:
- detecting a first quantity dependent on the instantaneous friction between the said wiper blade and the vehicle window;
- detecting a second quantity correlated to the aerodynamic load acting on the said wiper blade;
- determining the value of a third quantity correlated to the quantity of liquid present on the window on the basis of the said first and second detected quantity and by comparison with a predetermined reference model; and
- controlling the activation of the electric motor in a predetermined manner in dependence on the determined value of the said third quantity.

The operation of the control system forming the subject of the invention is based on the detection of the instantaneous friction between the wiper blade and the vehicle window. In a simple physical model this quantity is a function of the quantity of liquid present on the vehicle window and the aerodynamic load acting on the wiper blade, the term aerodynamic load meaning the aggregate of the contributions to the lift which is generated as a consequence of the motion of the vehicle and the pressure due to the opposing wind. According to the model, in each aerodynamic load condition the greater the quantity of rain or liquid detergent present on the window the lower the friction encountered by the wiper blade in the action of wiping over the surface of the window.

The friction between the wiper blade and the window can be detected qualitatively by measuring a quantity dependent on it and which is more easily accessible for measurement, such as, for example, the current consumed by the electric motor or the resistant torque applied to the motor itself.

The contribution of the aerodynamic load acting on the wiper blade can be estimated by detecting a quantity correlated to it such as the instantaneous pressure of the air in the region of the wiper blade or, more simply, the speed of the vehicle.

Once in possession of information relating to the instantaneous friction and the aerodynamic load it is possible to estimate the presumable quantity of liquid present on the window by comparison with a mathematical reference model previously obtained by experimental means, and stored in the form of a matrix of data.

In dependence on the quantity of liquid on the window deduced indirectly, and in particular on its variation over time, the system finally controls the operation of the wiper arm or arms by modifying operating parameters thereof such as the repetition frequency of the oscillations or possibly the duration of these as will be described in more detail hereinafter.

Further characteristics and advantages of the invention will be explained in more detail in the following description given by way of non-limitative example with reference to the attached drawing which illustrates a simplified block diagram of one embodiment of the system according to the invention.

For simplicity reference hereinafter will be made to a wiper device for a windscreen provided with a single arm and a single blade, but what will be described can be extended without substantial variation also to the case of several arms and several blades.

An electric motor for driving the wiper arm of the windscreen wiper device of a vehicle is indicated 10, whilst 12 generally indicates the assembly of wiper arm and wiper blade.

An electronic processing and control unit (for example a microprocessor) 14 is coupled to the electric motor and controls the activation of it by means of control signals generally indicated $s_c$.

The processing and control unit 14 receives a first input signal $s_1$ indicative of the current consumed by the electric motor 10, via a current sensor 16 of type known per se (for example a Hall sensor), and a second input signal $s_2$ indicative of the speed of the vehicle, via the tachometer 18 present on the vehicle.

Alternatively it is possible to use a sensor for detecting the resistant torque applied to the electric motor instead of the current sensor 16, and a pressure sensor for detecting the dynamic pressure exerted by the air on the blade in place of the measurement of speed obtained by means of the vehicle tachometer.

A programmable memory unit 20 is associated with the processing and control unit 14 and contains stored within it a matrix of data representing a mathematical model of the relationship between the current consumed by the electric motor, the vehicle speed and the quantity of liquid present on the windscreen (or between the corresponding chosen alternative quantities).

In a preferred embodiment it is advantageous to be able to discriminate between the causes of the presence of liquid on the windscreen, in particular to distinguish between the presence of rain (or hydrometeors in general) and the diffusion of a detergent liquid. If this possibility is contemplated for the control system, the control unit will have at least one logic input which will be activated by the request for the delivery of detergent liquids made by the driver.

The processing and control unit 14 is moreover programmed to evaluate the variations over time of the current or the drive torque and to make a comparison of the detected values (average, maximum or effective value, or a value processed from these) with the predetermined design safety limits. In this way the same control unit can advantageously replace conventional thermal protection with programmable protection.

The unit 14 is moreover driven at its input by a further two control signals, respectively an authorisation signal $s_a$ to authorise operation and an activation signal $s_w$ for a washing and cleansing operation. The first signal ($s_a$) transmits a command for activation/disactivation of the windscreen wiper device imparted by the vehicle driver and, in a particular embodiment of the system, information relating to the preselected mode of operation (intermittent or continuous operation at low or high speed) The second signal ($s_w$) makes it possible to communicate to the processing unit the information necessary to discriminate between the causes of the presence of liquid on the windscreen (rain or deliberate washing) and consequently to select the mode of operation required (for example assisted washing).

The processing and control unit 14 and the associated memory unit 20 are disposed on board the electric motor or, more advantageously, are integrated with other control devices present on the vehicle.

In a first embodiment the processing and control unit 14 is arranged to regulate the duration of each oscillation of the wiper arm by acting on the drive torque of the motor (the extreme case of this example is constituted by the choice between different speeds of cleansing, for example a low speed and a high speed).

In the case of rain the vehicle driver activates the windscreen wiper device and chooses a mode of operation thereof (intermittent or continuous operation). The processing unit detects, at each operating instant, the speed of the vehicle and the current consumed by the motor 10, and, starting from this data, via the (programmed) reference model available in the memory unit 20, derives information relating to the quantity of liquid present on the windscreen. On the basis of this information, and via an associated software programme, the processing unit 14 determines the duration of the oscillations necessary for an optimum cleansing of the windscreen and, after making a comparison with the present duration of the oscillations, emits a control signal $s_c$ to the electric motor to regulate its operation.

In particular, the processing and control unit commands a reduction of the duration of oscillations when it detects a presence of more liquid on the windscreen (substantially a lower friction between the wiper blade and the windscreen for the same aerodynamic load), or an increase of this duration when it detects the presence of less liquid on the windscreen (substantially a greater friction between the wiper blade and windscreen for the same aerodynamic load).

If, starting from the comparison between the variation over time in the value of the current consumed and the predetermined safety limit value, the processing and control unit detects an overheating condition of the motor, it stops the operation of the windscreen wiper device and signals this condition to the vehicle driver by means of a signalling device 24, then setting itself to receive a new authorisation signal $s_a$.

In a second embodiment the processing and control unit 14 is arranged to control operation of the wiper arm in single oscillations or groups of continuous oscillations of predetermined duration, separated from one another by rest intervals (intermittent operation), and to regulate the repetition frequency of such individual oscillations or groups of oscillations (that is to say the duration of such rest intervals).

In the case of rain the vehicle driver activates the windscreen wiper device and chooses an intermittent mode of operation thereof. The processing unit detects, at each operating instant, the speed of the vehicle and the current consumed by the motor 10, and, starting from this data, via the (programmed) reference model available in the memory unit 20 derives information relating to the quantity of liquid present on the windscreen. On the basis of this information and via an associated software programme the processing unit 14 determines the repetition frequency of the oscillations necessary for optimal cleansing of the windscreen and, following comparison with the actual repetition frequency of oscillations, emits a command signal $s_c$ to the electric motor to regulate its operation.

In particular the processing and control unit controls an increase in the repetition frequency of the oscillations when it detects a presence of more liquid on the windscreen (substantially a smaller friction between the wiper blade and the windscreen for a given aerodynamic load), or a reduction of this frequency when it detects the presence of less liquid on the windscreen (substantially a greater friction between the wiper blade and the windscreen for the same aerodynamic load). The repetition frequency of the individual oscillations or groups of continuous oscillations can be varied within a range of values lying between a minimum predetermined value as a function of the maximum current which can be consumed by the electric motor and a maximum predetermined value substantially corresponding to the duration of each oscillation or group of continuous oscillations.

If, starting from the comparison between the variation over time of the value of the current consumed and the predetermined safety limit value, the processing and control unit detects an overheating condition in the motor, it stops the operation of the windscreen wiper device and signals this condition to the vehicle driver by means of a signalling device 24, then setting itself to receive a new authorisation signal $s_a$.

In a further possible embodiment the processing and control unit 14 can be arranged to regulate both the repetition frequency of the oscillations in an intermittent function, and the duration of the continuous oscillations, by automatically switching between the two different modes of operation of the windscreen wiper upon variation of the deduced quantity of liquid present on the windscreen. This example of operation will not be described hereinafter in detail since it can be simply derived from the sequence of the examples already analysed in the preceding pages.

Naturally, the principle of the invention remaining the same, the embodiments and the details of construction can be widely varied with the respect to what has been described and illustrated purely by way of non-limitative example, without by this departing from the scope of protection of the present invention.

What is claimed is:

1. A system for controlling the operation of a vehicle window wiper device, the said device comprising:

an electric drive motor connected to at least one wiper blade arm and adapted to impart to the arm an oscillating movement; and a wiper blade for the window coupled to the said at least one wiper blade arm, the control system being adapted to control the operation of the wiper blade arm in a variable manner in dependence on the quantity of liquid present on the window, the control system comprising:

first sensor means for detecting a first quantity dependent on the instantaneous friction between the said wiper blade and the vehicle window, adapted to provide a first output signal corresponding to this first quantity;

second sensor means for detecting a second quantity correlated to the aerodynamic load acting on the said wiper blade, adapted to provide a second output signal corresponding to this second quantity; and a processing and control unit coupled to the said first and second sensor means for receiving the said first and second signal at its input, and arranged to:

determine a value of a third quantity correlated to the quantity of liquid present on the window on the basis of the received signals and by comparison with a predetermined reference model; and provide output command signals for controlling the activation of the electric motor in a predetermined manner as a function of the determined value of the said third quantity.

2. A system according to claim 1, wherein the said first sensor means are adapted to detect the current consumed by the electric motor.

3. A system according to claim 1, wherein the said first sensor means are adapted to detect the resistant torque applied to the electric motor.

4. A system according to claim 1, wherein the said second sensor means are adapted to detect the speed of the vehicle.

5. A system according to claim 1, wherein the said second sensor means are adapted to detect the dynamic pressure exerted by the air on the wiper blade.

6. A system according to claim 1, wherein the processing and control unit is arranged to regulate the duration of each oscillation of the wiper blade arm in dependence on the determined value of the said third quantity.

7. A system according to claim 6, wherein the processing and control unit is arranged to vary the duration of each oscillation within a range of values not greater than a maximum predetermined value in dependence on the maximum current which can be consumed by the electric motor.

8. A system according to claim 7, wherein the said processing and control unit is arranged to stop the operation of the wiper device when the duration of each oscillation of the wiper blade arm remains at the maximum value beyond a predetermined time interval.

9. A system according to claim 1, wherein the processing and control unit is arranged to control actuation of the wiper blade arm with individual oscillations or groups of continuous oscillations of predetermined duration, separated from one another by rest intervals, and to regulate the repetition frequency of the said individual oscillations or the said groups of oscillations as a function of the determined value of the said third quantity.

10. A system according to claim 9, wherein the processing and control unit is arranged to vary the repetition frequency of the said individual oscillations or the said groups of oscillations within a range of values lying between a minimum predetermined value established as a function of the maximum current which can be consumed by the electric motor and a predetermined maximum value established as a function of the duration of each oscillation.

11. A system according to claim 10, wherein the said processing and control unit is arranged to stop the operation of the wiper device when the repetition frequency of the individual oscillations or groups of oscillations of the wiper blade arm remains at the minimum value beyond a predetermined time interval.

12. A system according to claim 1, wherein the processing and control unit is arranged to recognise an overheating condition of the electric drive motor of the wiper device on the basis of received signals and by comparison with a predetermined mathematical thermal protection model.

13. A system according to claim 12, wherein the said processing and control unit is arranged to stop the operation of the wiper device when the said mathematical model recognises this overheating condition.

14. A system according to claim 8, including a signalling device for indicating that the operation of the wiper device has been stopped.

15. A system according to claim 12, wherein the said predetermined reference model and the said predetermined mathematical thermal protection model are stored in a memory unit associated with the said processing and control unit.

16. A system according to claim 1, wherein the said processing and control unit is positioned on board the said electric drive motor.

17. A system according to claim 1, wherein the said processing and control unit is integrated with other control devices present on the vehicle.

18. A system according to claim 1, wherein the said processing and control unit is able to control the activation of the electric motor in an assisted washing mode of operation if a window washing operation is activated by means of corresponding devices provided on the vehicle.

19. A method for controlling the operation of a vehicle window wiper device, the said device comprising:
- an electric drive motor connected to at least one wiper blade arm and adapted to impart to the arm an oscillatory movement, and
- a wiper blade coupled to the said at least one wiper blade arm,
- the method being adapted to control the operation of the wiper blade arm in a manner which varies as a function of the quantity of liquid present on the window,
- the method comprising the operations of:
- detecting a first quantity dependent on the instantaneous friction between the said wiper blade and the vehicle window;
- detecting a second quantity correlated to the aerodynamic load acting on the said wiper blade;
- determining a value of a third quantity correlated to the quantity of liquid present on the window on the basis of the said first and second detected quantities and by comparison with a predetermined reference model; and
- controlling the activation of the electric motor in a predetermined manner as a function of the determined value of the said third quantity.

20. A method according to claim 19, wherein the said first quantity is obtained by detecting the current consumed by the electric motor.

21. A method according to claim 19, wherein the said first quantity is obtained by detecting the resistant torque applied to the electric motor.

22. A method according to claim 19, wherein the said second quantity is obtained by detecting the speed of the vehicle.

23. A method according to claim 19, wherein the said second quantity is obtained by detecting the dynamic pressure exerted by the air on the wiper blade.

24. A method according to claim 19, wherein the control of the activation of the electric motor is effected by regulating the duration of each oscillation of the wiper blade arm in dependence on the predetermined value of the said third quantity.

25. A method according to claim 19, wherein the operation of the wiper blade arm is controlled to perform individual oscillations or groups of continuous oscillations of predetermined duration separated from one another by a rest interval, and in that the control of the activation of the electric motor is effected by regulating the repetition frequency of the said individual oscillations or the said groups of oscillations as a function of the determined value of the said third quantity.

* * * * *

UNITED STATES PATENT AND TRADEMARK OFFICE
CERTIFICATE OF CORRECTION

PATENT NO. : 6,184,642 B1
DATED : February 6, 2001
INVENTOR(S) : Francesco Ausiello It is certified that error appears in the above-identified patent and that said Letters Patent is hereby corrected as shown below:

Title page,
Item No. [73], Assignee, delete "DENJO MANUFACTURING ITALIA S.p.A."
insert -- DENSO MANUFACTURING ITALIA S.p.A. --.

Signed and Sealed this

Sixth Day of November, 2001

*Attest:*

NICHOLAS P. GODICI
*Attesting Officer*    *Acting Director of the United States Patent and Trademark Office*